E. DORR.
Hay Loader.
No. 43,482.
2 Sheets—Sheet 2.
Patented July 12, 1864.
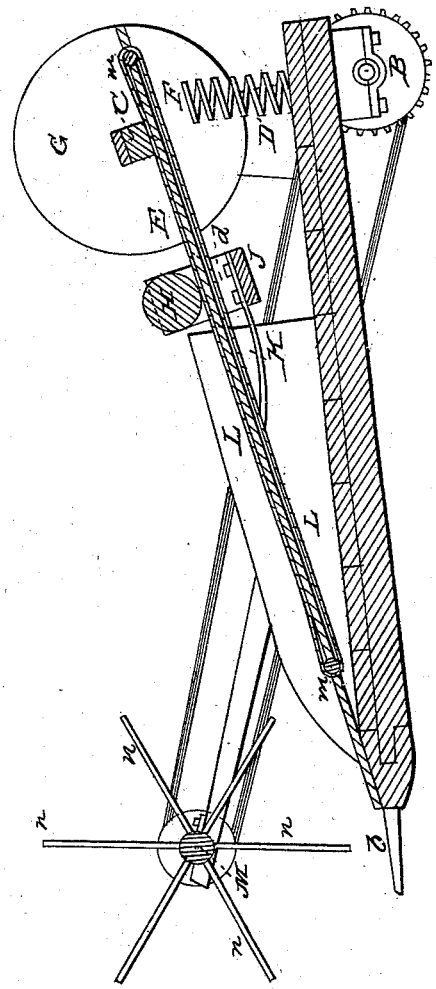
Witnesses:
Melville Biggs
W. C. Bemsbn
Inventor:
Edward Dorr
by his Attorney,
E. S. Renwick

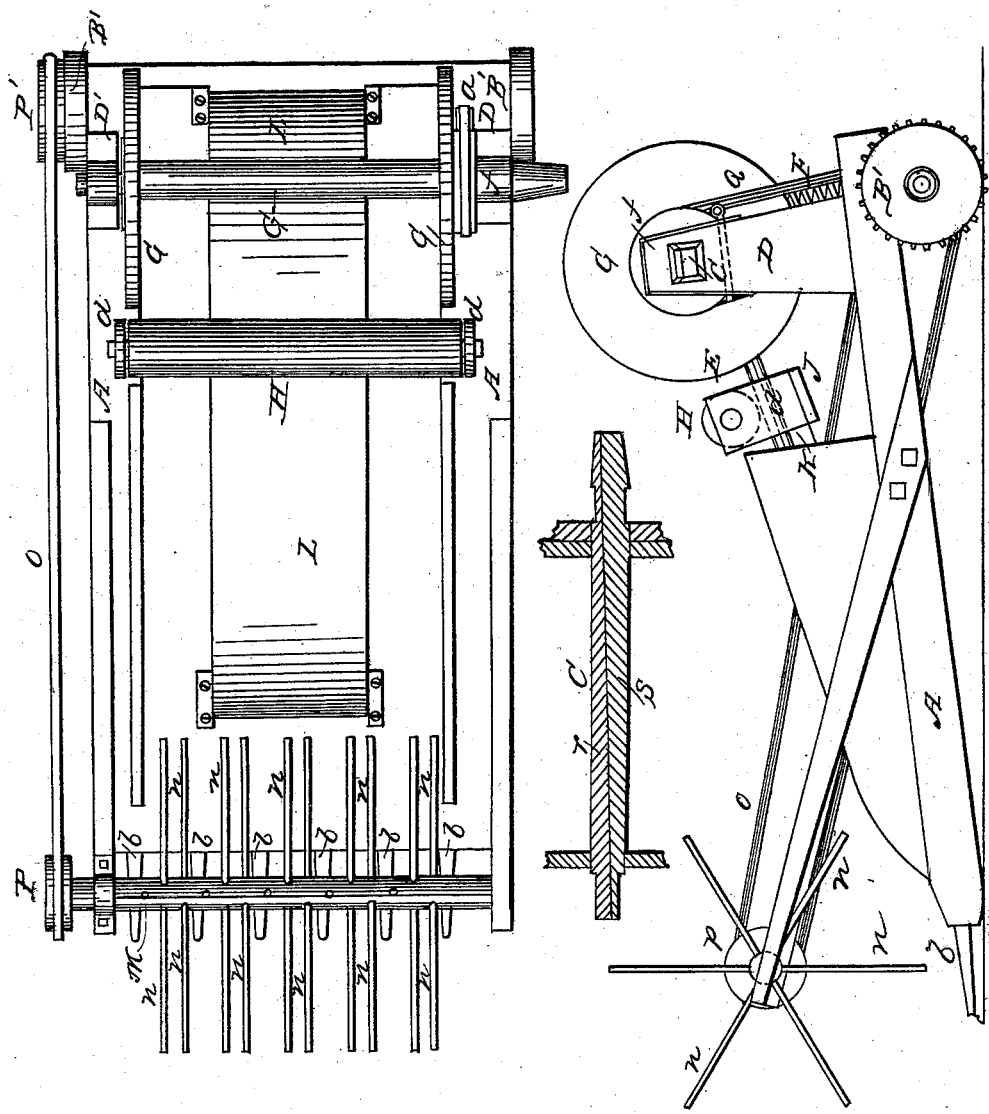

UNITED STATES PATENT OFFICE.

EDWARD DORR, OF ROCKFORD, ILLINOIS.

IMPROVEMENT IN MACHINES FOR BALING HAY AND OTHER MATERIALS.

Specification forming part of Letters Patent No. 43,482, dated July 12, 1864.

*To all whom it may concern:*

Be it known that I, EDWARD DORR, of Rockford, in the county of Winnebago and State of Illinois, have invented a new and useful machine for baling hay taken directly from the ground on which it is cut and for other purposes; and I do hereby declare that the following is a full, clear, and exact description of my invention, reference being had to the accompanying drawings, in which—

Figure 1 represents a plan of the principal parts of a machine constructed upon the principle of my invention. Fig. 2 represents a side view of the same. Fig. 3 represents a vertical longitudinal section of the same, and Fig. 4 represents a longitudinal section of the compressing-shaft of the machine.

Hay-presses as usually constructed operate to compress the entire mass of hay of which the bale is to be composed at the same time, and the power is applied to the entire surface of one side of the bale. Hence the amount of force required toward the last of the operation is enormous. Moreover, the mechanism employed, so far as I am acquainted with it, is wholly unsuited to the continuous baling of hay taken directly from the ground as fast as it is gathered.

The object of the invention which constitutes the subject-matter of this patent is to compress hay and similar materials—such as straw, grain in the stalk, cotton, flax, and hemp—into bales by acting upon a comparatively small portion of the material composing the bale at a time, and by acting upon every portion of the said material progressively, so that the force expended at any moment is comparatively small; also to bale or bundle such articles as hay and grain in the condition they exist in after cutting and before they are gathered up for removal from the ground, the machine used by me being drawn through the field in manner similar to a harvesting-machine.

The bales produced by my invention are cylindrical with flat ends, the material composing the bale being wound upon itself in successive layers, each of which tends to confine the preceding layers; and the first part of the invention consists of the combination of a shaft or its equivalent, on which the material is wound progressively, a pair of heads or their equivalent to confine the material laterally and give form to the heads of the bale, a platform or its equivalent, and springs or their equivalent to cause the platform and shaft to press the material between them with a yielding pressure, the whole operating in such manner that the material wound upon the shaft between the heads is compressed as it is wound, and that the shaft and platform separate as the bale increases in diameter.

The second part of the invention consists of the combination of the first part of the invention with a roller and springs or their equivalent to compress the layer of material previous to its being wound into a bale.

The third part of the invention consists of the combination of the first part of the invention with an endless apron to convey the material to the pressing machinery.

The fourth part of the invention consists of the combination of the first part of the invention with a carriage fitted with fingers, so that hay or grain in the field may be gathered up and compressed into a bale or bundle by a continuous operation without taking the material to a stationary press.

The fifth part of the invention consists of the combination of the first part thereof with a carriage fitted with fingers and a raking or gathering mechanism, so that hay or grain in the field may be gathered up and baled automatically by drawing the machine over the field.

The sixth part of the invention consists in the construction of the compressing-shaft, on which the bale is wound, in two parts, tapering in opposite directions, so as to facilitate its withdrawal from the bale.

The accompanying drawings represent a machine embodying my invention, and suitable to be drawn by horses over a field for the purpose of gathering up and baling hay. All the acting parts of this machine are secured to a carriage, which is to be fitted with a tongue by which it can be drawn by horses, said tongue not being shown in the drawings, as the construction, application, and operation of a draft-tongue are well known to builders and users of agricultural machines. The side pieces, A A, of this carriage are curved at their forward ends like sled-runners, so as to slide over the ground. At their hinder ends they are supported by wheels B B', one of which is connected with and operates the pressing mechanism, while the other, B, operates the automatic gatherer. The front side of carriage is fitted with rake-teeth *b b*, which rake the hay as the machine is drawn forward, and operate in substantially the same manner as the teeth of horse-rakes.

The compressing and gathering mechanisms are mounted upon the carriage. The shaft C, on which the material is wound, is supported by standards D D', the cap *f* of one of which is removable to permit the shaft to be readily removed when the bale is completed and replaced before the formation of a new bale is commenced. Below this shaft is the platform E, between which and the shaft C the material is compressed. This platform is formed in this instance of a spring-board secured at its front end to the carriage, so that its hinder end (which is beneath the compressing-shaft C) can yield and separate from the shaft as the bale increases in diameter, but presses the material wound on the compressing-shaft with a force due to the elasticity and rigidity of the wood of which it is composed. In order to increase the force used in compressing the material, springs F are introduced beneath the platform; and in this instance these are arranged, as shown in the drawings, to remain inoperative until the bale has reached a certain diameter. The compressing-shaft C is fitted with a pair of removable heads, G G, which confine the material laterally and determine the form of the ends of the bale produced.

The teeth, as represented in the drawings, are situated at the front of the machine and the compressing mechanism at its hinder end. Between these two there is a yielding roller, H, to act upon the material passing along the platform to the compressing-shaft C, and thus compress the layer before it is wound upon the shaft. The journals of this roll are supported in standards *d d*, which are connected with a cross-beam, J, beneath the platform E, and with springs K, (one at each side of the platform,) so that the roller operates with a yielding pressure upon the layer of material passing beneath it to the compressing-shaft C.

In order that the material may be conveyed from the front end of the machine to the compressing mechanism, an endless apron or conveyer, L, is provided. This apron is supported by two rollers, *m m*, at its ends, and its upper portion lies upon the platform and passes under the compressing-shaft C, so that the bale lies upon it. Hence the surface of the compressing-shaft C will move the apron by contact with it before the bale is commenced, and as soon as the bale begins to form its surface will move the apron by contact. The apron may, however, be driven by a special mechanism, if this plan be deemed expedient.

In order that the material may be gathered up automatically, an automatic rake or gatherer is employed. This consists, in the machine represented, of a series of radial arms, *n*, secured to a shaft, M, to which a revolving movement is imparted by means of a belt, O, encircling belt-pulleys, P P', secured to the shaft M and to one of the running-wheels, B, so that the gatherer is caused to revolve automatically as the machine is drawn over the field. The compressing-shaft C is caused to revolve in a similar manner by means of the driving-wheel B' and in the machine represented (which is an illustration of one mode of embodying my invention) the power is transmitted from the shaft of the running-wheel to the compressing-shaft by a belt, Q. I contemplate, however, the employment of cog-wheel gearing for this purpose whenever the force required to wind up the material under the pressure is such that a belt would slip. The compressing-shaft C is formed tapering, so that it may be more readily withdrawn from the complete bale; and in order to facilitate this operation the shaft is formed of two parts, *r s*, which are wedge-formed in opposite directions, so that one may be withdrawn before the other. The end of this shaft is made square, so that a capstan-head or a crank may be applied to it, or gearing so as to operate the shaft and compress material fed to the machine into bales when the machine is at rest. In order to diminish the friction, one or more rollers may be arranged under the upper member of the conveying-apron parallel with and opposite to the compressing-shaft.

The machine thus described is designed to rake up and bale hay from the field, so as to dispense with the necessity of conveying it to a stationary press. It may also be used as a stationary press, in which case the compressing-shaft is to be driven by any suitable power, and the hay or other material is to be fed upon the apron L.

Parts of my invention may be used without others — as, for example, the first part of it may be used in the construction of a stationary press to press hay or cotton in a building.

The invention may also be embodied in different forms—as, for example, it may be embodied in a reaping-machine for cutting grain in such manner that the grain falling upon the platform behind the teeth or fingers of the machine is baled or bundled before it is discharged from the machine. In this form the fingers of the reaping-machine replace the fingers at the front end of the carriage of the machine I have described, and the reel or raking mechanism of the harvester replace the automatic gatherers. The use of the invention in this form dispenses with the necessity of binding the grain into sheaves, and the grain is in a good condition for subsequent operations, as the opening in the center of the bundle from which the compressing-shaft is withdrawn permits it to dry. It is also easily fed to a thrasher by unwinding the layer and delivering it as unwound upon the feed-apron of the thrasher.

The machine may also be varied in construction without substantially changing its mode of operation—as, for example, by constructing the platform or its equivalent in such manner that it is stationary, and the compressing-shaft so that it is movable, and applying springs or weights to the compressing-shaft, so that it may separate from the stationary platform (as the bale increases in diameter) with a yielding pressure.

In the baling of materials which are to remain in the bale for transportation to market—such as hay, straw, and raw cotton—the bale should be secured by a few longitudinal staves and one or more bands of wire or cord. The bands may, however, be of much less strength than those usually required for bales, as the wrapping of each succeeding layer of stalks or fiber around its predecessors assists in binding them together.

What I claim as my invention, and desire to secure in this patent, is—

1. The combination of a compressing-shaft, lateral confining-heads, platform, and springs operating to compress hay, cotton, and similar materials into a bundle or bale, substantially as set forth.

2. The combination of the preceding combination with a roller and springs, operating to compress the material in the layer previous to its compression into the bundle or bale, substantially as set forth.

3. The combination of the first preceding combination with a conveyer, the whole operating substantially as set forth.

4. The combination of the first preceding combination with a carriage fitted with fingers so operating that the material may be gathered and baled or bundled from the ground, substantially as set forth.

5. The combination of the first preceding combination with a carriage fitted with fingers and gathering mechanism operating substantially as set forth.

6. The construction of the compressing-shaft in two parts tapering in opposite directions, substantially as set forth.

In testimony whereof I have hereunto subscribed my name this 19th day of March, A. D. 1864.

EDWARD DORR.

Witnesses:
J. G. MANLOVE,
ALBERT E. WHITE.